US010637826B1

United States Patent
Luo et al.

(10) Patent No.: US 10,637,826 B1
(45) Date of Patent: Apr. 28, 2020

(54) POLICY COMPLIANCE VERIFICATION USING SEMANTIC DISTANCE AND NEAREST NEIGHBOR SEARCH OF LABELED CONTENT

(71) Applicant: Facebook, Inc., Menlo Park, CA (US)

(72) Inventors: Enming Luo, Fremont, CA (US); Emanuel Alexandre Strauss, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 77 days.

(21) Appl. No.: 16/056,134

(22) Filed: Aug. 6, 2018

(51) Int. Cl.
   *H04L 29/06* (2006.01)
   *G06N 3/04* (2006.01)
   *G06K 9/62* (2006.01)
   *G06K 9/72* (2006.01)

(52) U.S. Cl.
   CPC ........ *H04L 63/0227* (2013.01); *G06K 9/6215* (2013.01); *G06K 9/6276* (2013.01); *G06K 9/726* (2013.01); *G06N 3/0472* (2013.01)

(58) Field of Classification Search
   CPC .. H04L 63/0227; G06N 3/0472; G06K 9/726; G06K 9/6215; G06K 9/6276
   USPC .......................................................... 726/1
   See application file for complete search history.

(56) References Cited

U.S. PATENT DOCUMENTS

| | | | | |
|---|---|---|---|---|
| 2005/0143971 | A1* | 6/2005 | Burstein | G06F 17/274 704/4 |
| 2007/0121522 | A1* | 5/2007 | Carter | H04L 43/00 370/252 |
| 2014/0015855 | A1* | 1/2014 | Denney | G06K 9/6218 345/629 |
| 2019/0073592 | A1* | 3/2019 | Luo | G06N 3/0454 |
| 2019/0073593 | A1* | 3/2019 | Luo | G06F 21/6218 |
| 2019/0156061 | A1* | 5/2019 | Chakraborty | H04L 63/0421 |
| 2019/0392082 | A1* | 12/2019 | Bell | G06Q 30/0625 |

* cited by examiner

*Primary Examiner* — Kambiz Zand
*Assistant Examiner* — Aubrey H Wyszynski
(74) *Attorney, Agent, or Firm* — Fenwick & West LLP

(57) ABSTRACT

An online system determines whether a test content item violates a policy of the online system. The online system extracts a semantic from the test content item and determines a distance between the extracted semantic vector and the stored semantic vectors for content items that have been labeled to indicate whether they violate a policy. Using a nearest neighbor search, the online system selects a set of the stored semantic vectors and assigns a weight to the selected semantic vectors that is inversely related to the distances. The online system then determines whether the test content item violates a policy using a weighed voting scheme, where the labels of the stored semantic vectors are aggregated based on their associated weights. The online system may first attempt to match the test content with known bad content and terminate the more complex nearest neighbor search if such a match is found.

20 Claims, 4 Drawing Sheets

US 10,637,826 B1

POLICY COMPLIANCE VERIFICATION USING SEMANTIC DISTANCE AND NEAREST NEIGHBOR SEARCH OF LABELED CONTENT

FIELD OF INVENTION

This disclosure generally relates to the verification of content for compliance with the policies of an online system, and in particular, to compliance verification using semantic analysis in which labeled content is determined from a nearest neighbor search based on its semantic distance from a test content item to classify the test content item's compliance with the policies of the online system.

BACKGROUND

Online systems, such as social networking systems, allow users to connect to and communicate with other users of the online system. For example, an online system may allow users to share content with other users of the online system by providing content items to the online system for presentation to other users. In addition, content providers may submit content items to the online system to be provided to users likely to interact with them. Often content items include text data, as well as image data, audio data, video data, and/or any other type of content that may be communicated to a user of the online system.

To ensure a high-quality user experience, an online system may remove or prevent certain content items from being displayed to users of the online system, based on text data associated with each content item. The presentation of content items within the online system may be restricted by one or more policies, for example a policy that disallows content items having text associated with certain categories of content (e.g., adult content, illegal content, and/or the like).

The online system may maintain a review process to identify instances of content items including text that violates one or more policies, and are thus ineligible for presentation to users. Conventional systems require human reviewers to manually review content items received from content providers to determine their eligibility for presentation. However, as the number of content providers using the online system increases, so does the number of content items to be reviewed, for example hundreds of thousands of content items in a few days or a week. Existing attempts to automate the review process, for example, searching for offensive keywords are often unable to identify complex policy violations, require a large amount of processing time to review the hundreds of thousands of content items and a large amount of storage space in computer memory. Therefore, conventional techniques for identifying content items that violate policies of the online system are ineffective, expensive, and time-consuming.

SUMMARY

Embodiments perform semantic analysis of content items to automatically determine whether content items violate one or more policies of an online system by comparing a semantic vector extracted for the content items with semantic vectors for previously examined and labeled (e.g., "good" or "bad") content items. A policy may specify attributes of content items that are eligible for presentation to users of the online system. For example, a policy may specify that content items including profanity are not suitable for presentation to users of the online system.

In one embodiment, an online system determines whether a test content item to be displayed to users contains text or other features that violate a policy of the online system. The online system stores a semantic vector for each of a plurality of content items that have been labeled to indicate whether the content item has violated a policy of the online system. The online system receives a test content item and extracts a semantic vector based on text or other features within the test content item. The extracted semantic vector indicates one or more semantic features of the test content item. For each stored semantic vector, the online system determines a distance between the stored semantic vector and the extracted semantic vector of the test content item. Using a nearest neighbor search, the online system selects a set of the stored semantic vectors. The online system assigns a weight to each of the selected semantic vectors, where the weight is inversely related to the determined distance. The online system then determines whether the test content item violates a policy using a weighed voting scheme, where the labels of the stored semantic vectors are aggregated based on their associated weights. In this way, the online system compares the semantic vector for the test content item with stored previously labeled semantic vectors of other content to determine whether the test content item violates one or more policies.

In one embodiment, the online system first attempts to match the test content with known bad content. For example, the online system determines whether the extracted semantic vector of the test content item is identical to, or within a threshold distance of, a stored semantic vector for a content item labeled as violating the policy. For this determination, the online system may search a data store that contains only semantic vectors for content items that have been labeled to violate a policy. If an identical or nearly identical stored semantic vector is found, the test content item is declared to violate a policy as well, and the further search of the semantic vectors for multiple nearest neighbors is terminated. Since the multiple nearest neighbor search is on a much larger data set and is more complex (e.g., the nearest neighbor search for multiple semantic vectors is on a data store than includes semantic vectors for both good and bad content), this early termination avoids the more computationally expensive search when the test content matches, or nearly matches, known bad content. This helps to save computing resources and lowers the latency time required to evaluate a set of content items for compliance with the policies of the online system.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
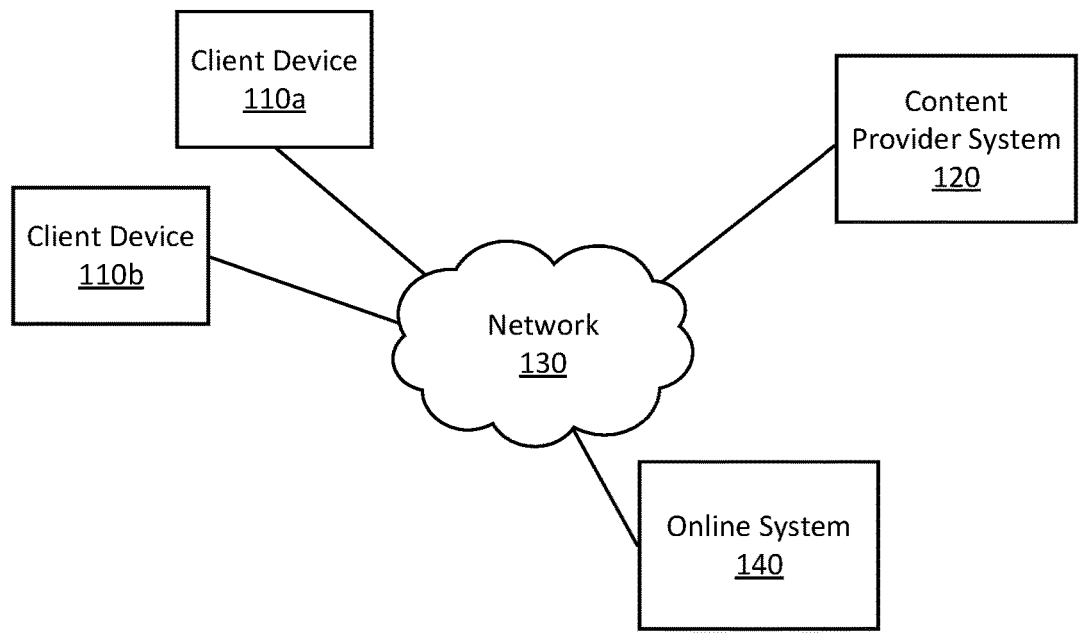
FIG. 1 is a high-level block diagram of a system environment, in accordance with an embodiment of the invention.

FIG. 1 is a high-level block diagram of a system environment 100, in accordance with embodiment. In the embodiment shown by FIG. 1, the system environment comprises client devices 110a and 110b, a content provider system 120, the network 130, and the online system 140. However, in other embodiments, the system environment 100 may include different and/or additional components.

The client devices 110 are one or more computing devices capable of receiving user input with data processing and data communication capabilities. In one embodiment, a client device 110 is a conventional computer system, such as a desktop or a laptop computer. Alternatively, a client device 110 may be a device having a functionality, such as personal digital assistants, smart phones or any other device including computing functionality and data communication capabilities. A client device 110 is configured to communicate via the network 130. In one embodiment, a client device 110 executes an application allowing a user of the client device 110 to interact with the online system 140. For example, a client device 110 executes a browser application to enable interaction between the client device 110 and the online system 140 via the network 130. In another embodiment, a client device 110 interacts with the online system 140 through an application programming interface (API) running on a native operating system of the client device 110, such as such as IOS®, ANDROID™. User devices may be used by a user of the online system 140 that consumes the services offered by the online system 140, for example, a member of a social networking system. Content received by the online system 140 from the content provider system 120 is targeted and presented to users of the online system 140 through client devices 110.

A content provider system 120 communicates with the online system 140 via the network 130, as further described below in reference to FIG. 2. In one embodiment, a content provider system 120 is an application provider communicating information describing applications for execution by a client device 110 or communicating data to client devices 110 for use by an application executing on the client devices 110. In other embodiments, a content provider system 120 provides content or other information for presentation via a client device 110. A content provider system 120 may also communicate information to the online system 140, such as advertisements, content, or information about an application provided by the content provider system 120. The content provider system 120 may provide web pages to client devices 110 that send a request to the third party website, for example a hypertext transfer protocol (HTTP) request.

Interactions between the content provider system 120, the client device 110, and the online system 140 are typically performed via the network 130, which enables communication between client devices 110, content provider systems 120, and the online system 140. The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 130 may also utilize dedicated, custom, or private communication links. The network 130 may comprise any combination of local area and/or wide area networks, using both wired and wireless communication systems.

The online system 140 provides the medium for content distributions from content providers to users via client devices 110, as further described below. The online system 140 receives content from a content provider system 120 via the network 130, processes the received content. After processing the received content, the online system 140 may identify and distribute content to users of the online system 140. FIG. 2 is a block diagram of the system architecture of the online system 140, according to an embodiment. The online system 140 includes a policy information store 210, semantic vector store 240, test content store 220, vector extraction module 230, a distance module 250, a vector analysis module 260, a content distribution module 270, and a web server 280. Other embodiments of the online system 140 may include more or fewer modules than those presented in FIG. 2 and functionality indicated as being performed by a particular module may be implemented by other modules.

The policy information store 210 stores policies which, when implemented, determine the eligibility of content items stored in the test content store 220 to be displayed to users of the online system 140. The policies within the policy information store 210 restrict the types or categories of content items that may be displayed to users of the online system 140, for example content soliciting the selling/purchase of certain types of goods or services, content containing profanity, sexual content, violent content, racist content, illegal content, and/or the like, such that content items depicting restricted content are deemed ineligible for display to users of the online system 140. In some embodiments, a policy may apply to only a subset of the users of the online system 140 (e.g., a particular policy may restrict certain content from being displayed to users below a threshold age, but permit the display of the content to users above the threshold age) or only to certain contexts of the online system 140 (e.g., a policy restricting certain content may be enforced when a user is accessing a specific social page of the online system). As used herein, the term "eligible" may be used to refer to a test content item compliant with the policies of the online system 140 stored within the policy information store 210. Alternatively, the term "ineligible" may be used to refer to a test content item in violation of at least one policy of the online system 140 stored within the policy information store 210.

For each policy within the policy information store 210, the online system 140 stores a policy object corresponding to each policy. The policy object for a policy may specify various attributes or metadata of the policy such as a policy name/identifier, types of content or content items that the policy applies to, attributes of users to which the policy applies, etc. In some embodiments, a policy object stores one or more rules specifying types of content items that conform to the policy or violate the policy. In some embodiments, the information corresponding to content items associated with each policy are stored in separate databases based on the type of information, the types of content items, or the types of policies. Additionally, a single content item may be in violation of a single policy, multiple policies, or a combination of several policies and accordingly be stored in multiple databases.

In some embodiments, the policy information store 210 may store information associated with content items that have been previously determined to violate a particular policy. To initialize the policy information store 210, the online system 140 may receive content items which have been determined by an authorized user to be in violation of one or more policies of the online system 140. The policy information store 210 is periodically updated to include content items in violation of policies within the online system 140 and content items compliant with policies of the online system 140. As a result, over time, the policy information store 210 expands the amount of content items to be referenced against test content items, improving the accuracy with which ineligible test content items are detected.

The test content store 220 stores content items, for example, content items received from content provider systems 120. Content items received from content provider systems 120 may be subject to an analysis to determine their eligibility for presentation to users of the online system 140. Such content items are hereafter referred to as "test content items." For example, the eligibility of a test content item may be based on one or more of the policies of the online system 140 as stored in the policy information store 210. The test content store 220 also stores metadata associated with each content item within the online system 140, for example, the user account of the content provider system 120, targeting criteria associated with the content item that describe attributes of users to who the content item should be directed, and so on.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify an image from a content item and provide the image for presentation rather than the content item in its entirety.

Various content items may be associated with an objective that a content provider 120 of the content item expects users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user or content provider system 120 associated with content item as online system users perform interactions with a content item that satisfy the objective included in the content item.

More specifically, test content items may comprise one or more pieces of text, an image, or other type of media containing text or associated with textual metadata, a link to landing page containing text. In some embodiments, the test content item is provided to the online system 140 as a screenshot of a video or a landing page corresponding to the content item.

The vector extraction module 230 receives test content items containing text and extracts a semantic vector describing the attributes of the content items. In one embodiment, the vector extraction module 230 implements an autoencoder that takes an input, encodes an input, and regenerates an output that matches the input. For example, the autoencoder may be configured to receive a sequence as an input, encode the sequence to a semantic vector representation, and regenerate the input sequence as the output. The semantic vector representation is a compressed version of the input sequence, for example semantic phrases within a content item. In one embodiment, the semantic vector representation has a fixed number of dimensions (or elements), independent of the size of the input sequence. A semantic vector may be stored as an array of semantic feature values, each of which describes the features or properties of the text within a content item.

To extract a semantic vector, the vector extraction module 230 is configured to extract text from a content item. In some embodiments, the vector extraction module 230 determines a type of the test content item to extract text from the content item. For example, where the test content item comprises text, the text extraction module 304 merely returns the text. In some embodiments, the vector extraction module 230 may perform character recognition to extract text displayed in an image or video test content item. In some embodiments, if the test content item comprises audio signals, the vector extraction module 230 performs transcription of the audio signal to convert at least a portion of the audio signals to text. In some embodiments, the vector extraction module 230 may access a landing page associated with the test content item and extract text from the landing page.

As described above, the vector extraction module 230 generates a semantic vector corresponding to the extracted text of the test content item. The semantic features that may be represented in the semantic vector of the test content item may include a content or objective associated with the extracted text, one or more subjects of the extracted text, descriptors of one or more subjects of the extracted text, and/or the like. For example, the vector extraction module 230 may use a feature extraction algorithm to identify semantic features within the extracted text.

Once extracted, semantic vectors of test content items are stored in the semantic vector store 240. The semantic vector store 240 comprises several previously extracted semantic vectors for previously received test content items including semantic vectors previously labeled as eligible or ineligible for presentation to users of the online system 140 using the processes and techniques described below. Additionally, the semantic store 240 may include test content items labeled manually by an authorized user of the online system 140. In an alternate embodiment, the semantic vector store 240 filters out content determined to be eligible based on the policies of the online system 140 and only stores test content items determined to be ineligible for presentation to users of the online system 140. In such an embodiment, computer memory storage within the online system 140 is optimized by reducing the number of labeled semantic vectors stored by the online system 140. In one embodiment, the semantic vector store 240 is further divided into an eligible semantic vector store and an ineligible semantic vector store (not shown).

By maintaining a record of semantic vectors for each policy corresponding to the extracted text of test content items that have been historically determined to be in violation of a policy, and comparing semantic vectors of extracted text associated with newly received test content items with those of the historical content items, test content items having extracted text that is semantically similar to policy-violating content items, and thus also likely to be in violation of a policy, may be automatically identified. As such, if a content provider system 120 creates several variations of a policy-violating content item, the different variations can be automatically detected and prevented from being displayed to users of the online system 140, with minimal intervention by human agents.

Test content items having an extracted text with similar semantic features may have similar corresponding semantic vectors. As such, semantic vectors corresponding to the extracted text of different test content items may be compared in order to determine a level of semantic similarity between the extracted texts of the different test content items. Accordingly, if each vector was represented as a point in a multidimensional space, two text strings with similar semantic features will correspond to points that are close to each other in the multidimensional space, while text strings with different semantic features correspond to the points that are far apart in the multidimensional space. The distance between the points of two semantic vectors is the distance in this multidimensional space.

As a result, the distance between two points corresponding to two text strings is indicative of the semantic similarity between the two text strings. Distances may also correspond to any type of measurement describing a degree of similarity between two vectors. For example, in some embodiments, the distance between different semantic vectors may correspond to a Euclidean distance between the vectors. In embodiments where the semantic vectors are expressed as binary vectors, a distance between the vectors may correspond to a Hamming distance.

Upon extracting a semantic vector from a test content item, the distance module 250 determines a distance between the semantic vector of the test content item and at least one semantic vector stored within the semantic vector store 240. The distance module 250 may map features of the test semantic vector to similar features of other semantic vectors with small distances between them. In addition to the description above, the term "distance" may correspond to any type of measurement that indicates a degree of similarity between two vectors. In some embodiments, a particular semantic vector may correspond to the extracted text of different content items if there are only minor differences between the semantic features of the extracted text of the different content items. As the differences of the semantic features between different pieces of extracted text increase, the distance between the corresponding semantic vectors may increase. When the semantic vector of the extracted text comprises an embedding representing the extracted text obtained from a hidden layer of a neural network, the determined distance may correspond to a Euclidean distance. Alternatively, where the semantic vector of the extracted text corresponds to a binary vector, the determined distance may be a Hamming distance. The distance module 250 determines the distances between the semantic vector of the test content item and one or more of the stored semantic vector and assigns the eligibility label of the closest stored semantic vector to the semantic vector of the test content item.

In some embodiments, different content items may contain text that is different but semantically similar. For example, content providers 120 of ineligible content items may create different variations of content items having text that is visually different (e.g., different order of words, additional filler words, etc.) but semantically similar or identical. For example, a first content item may be associated with the text "Lawnmower for sale: $100," while a second item may be associated with the text "Anyone want to buy a lawnmower?" While the actual text in the first and second content items is different, they may be considered semantically similar to the extent that if the first content item violates a particular policy (e.g., a policy prohibiting content items advertising sale of certain types of goods), then the second content item most likely would also violate the particular policy. As such, a simple text comparison or keyword search may not be sufficient to identify content items that are semantically similar variations of each other.

As such, the distance module 250 may perform semantic analysis of the text associated with content items to determine semantic similarities of different content items. Each piece of extracted text is associated with semantic features indicating a context of the text, a subject of the text, an objective of the text, and/or the like. By extracting the semantic features of the text associated with different content items, the extracted text of the content items can be compared with each other to determine a level of similarity that ignores non-substantive variations between the content items (such as different phrasing, word order, and/or the like).

Based on the distances determined by the distance module 250, the vector analysis module 260, may review the distances between the semantic vector extracted from the test content item and the stored semantic vectors and label the semantic vector of the test content item as eligible or ineligible. In one embodiment, the vector analysis module 260 may determine the eligibility of a test content item based on one or a specific category of policy stored in the policy information store 210 and the corresponding stored semantic vectors. Alternatively, the vector analysis module 260 may determine the eligibility of a test content item based on a combination of policies of different types or categories and corresponding stored semantic vectors. The vector analysis module 260 may receive the shortest distance determined by the distance module 250 and the associated content items, or alternatively, may receive a group of the shortest distances. The number of the distances received by the vector analysis module 260 may be determined based on settings established by users of the online system 140 or based on the type of vector analysis being performed. Types of vector analysis will be described in further detail in regard to FIGS. 4-5.

In a first embodiment, in which the vector analysis module 260 receives a single, shortest distance from the distance module 250, the vector analysis module 260 compares the distance to a threshold distance. The threshold distance represents a minimum level of similarity between two semantic vectors required to determine the eligibility of one content item based on the known eligibility of the other content item. For example, if the semantic vector for an ineligible content item is compared to the semantic vector of a test content item at a threshold distance of 0.4 and the determined distance is 0.5, the two content items are not close enough in distance for the test content item to also be labeled as ineligible. However, if the determined distance was 0.3, the test content item would be similar enough to be identified as ineligible under the policies associated with the ineligible content item. In some implementations, in order to determine a holistic eligibility of a test content item under all policies of the online system 140, the vector analysis module 260 receives distances from multiple stored semantic vectors associated with different policies.

In a second embodiment, in which the vector analysis module 260 receives a set of shortest distances, for example the five shortest distances, the vector analysis module 260 may implement a second threshold distance in addition to the first distance. The first threshold distance, as described above, may be implemented to identify a single stored semantic vector within a threshold distance of the semantic vector of the test content item. However, if a single stored semantic vector cannot be identified within the first threshold, the vector analysis module 260 identifies several stored semantic vectors with distances within a second threshold distance and, from that group, determines the eligibility of the test content item based on the distance representing the closest stored semantic vector.

Returning to the above example of the five stored semantic vectors with the shortest distances (SV1, SV2, SV3, SV4, and SV5). The distance module 250 determines that SV1, SV2, SV3, SV4, and SV5 have distances of 0.1, 0.3, 0.5, 0.6, and 0.7, respectively. Implementing a first threshold distance of 0.5, the vector analysis module 260 identifies no stored semantic vectors with distances below the threshold distance and proceeds to implement the second threshold distance of 0.4. Compared to the second threshold distance of 0.4, the vector analysis identifies SV1 (with a distance of 0.1) and a SV2 (with a distance of 0.3) as within the second threshold distance. Accordingly, the vector analysis module 260 determines the eligibility of the test content item based on the eligibilities labels assigned to SV1 and SV2. Alternatively, if the vector analysis module 260 were to implement first threshold distance of 0.2, SV1 (with a distance of 0.1) would be the only identified stored semantic vector within the threshold distance and the eligibility of the test content item would be determined based on the eligibility of SV1. Because a single stored semantic vector (SV1) was within the first threshold distance, the vector analysis module 260 may not consider SV2, SV3, SV4, and SV5 in comparison to the second threshold distance.

The second embodiment, as described above, may implement tiered threshold distances, for example a first threshold distance indicating a distance at which the likelihood of the extracted text of the test content item violating the policy exceeds 90% and a second threshold distance indicating a distance at which the likelihood of the extracted text of the test content item violating the policy exceeds 60%. In some embodiments, different categories of policies are associated with different threshold distances.

Continuing from the above example involving SV1, SV2, SV3, SV4, and SV5 and their respective distances, the vector analysis module 260 may not treat the first threshold distance as a definitive eligibility determinant, but rather as a measure of the likelihood that a test content item violates at least one policy. An eligibility determination made based on the first threshold distance, for example 0.5, may indicate that there is a 90% chance that the test content item violates at least one policy of the online system based on the stored semantic vectors within the first threshold and a determination made based on the second threshold distance, for example 0.4, may indicate that there is a 60% chance that the test content item violates at least one policy of the online system based on the stored semantic vectors within the second threshold distance.

By comparing the determined distances between the extracted semantic vectors and one or more stored semantic vectors, the vector analysis module 260 determines if the test content items is likely to violate a particular policy or set of policies. For test content items associated with a distance within a threshold to a stored ineligible content item, the vector analysis module 260 determines that the test content item would also be ineligible for presentation to users of the online system 140. Similarly, for test content items associated with a distance within a threshold to a stored eligible content item, the vector analysis module 260 determines that the test content item would also be eligible for presentation to users of the online system 140. In some embodiments, the accuracy of the eligibility status of a test content item may be directly related to the threshold distance. At lower values of threshold distances (i.e., a smaller distance between stored semantic vectors and extracted semantic vectors), the accuracy of the determined eligibility status increases. After determining whether the test content items is eligible or ineligible, the extracted text, semantic vector, or test content item may be stored within the semantic vector store 240.

In some embodiments, the vector analysis module 260 may base its determination of the suitability of the extracted text of the test content item on review by an authorized user. For example, the vector analysis module 260 may submit the extracted text to an authorized user for evaluation (e.g., by enqueuing the test content item and/or the extracted text of the test content item into a review queue accessible by the authorized user). In some embodiments, the authorized user corresponds to a human authorized user, who may manually indicate whether the extracted text violates a policy or is acceptable under the plurality of policies. In other embodiments, the authorized user corresponds to an automated authorized user, such as an expert system. In some embodiments, the vector analysis module 260 only submits the extracted text for review by the authorized user under certain circumstances (e.g., if the received distance between the semantic vector of the extracted text and the closest semantic vector of the respective data store is between a first threshold and a second threshold distance). In some embodiments, the authorized user reviews only the extracted text of the test content item to determine whether the extracted text violates one or more policies. In other embodiments, the authorized user may review the test content item as a whole in order to determine whether the test content item contains text that violates one or more policies. In some embodiments, the vector analysis module 260 uses the results of the authorized user review to update an authorized user review data store (not shown), which stores a record of results of previously performed instances of authorized user review. For example, the authorized user review data store may comprise a table or other data structure indicating the semantic vectors associated with the test content items reviewed by the authorized users, as well as the results of each review (e.g., which policies the test content item violated, if any).

The content distribution module 270 filters through the contents of semantic vector store 240 and identifies content items eligible for presentation to users of the online system 140 and excludes content items ineligible for presentation to users of the online system 140. In some embodiments, ineligible content items are placed on a black list to be referenced in future iterations of the vector analysis module 260 and eligible content items are placed on a white list to be reference in future iterations of the vector analysis module 260. From the white list of eligible content items, the content distribution module 270 generates a queue of content items to be presented to a user of the online system 140 based on the set of interests of the user within the online system 140.

In particular embodiments, content within the online system 140 may be associated with one or more privacy settings. Although the examples discussed herein are in the context of an online social network, the privacy settings may be applied to any other suitable computing system. Privacy settings, also referred to as "access settings," for a content item may be stored in any suitable manner, for example in association with the content item in an index on an authorization server, in another suitable manner, or in any combination of suitable manners. A privacy setting for an object may specify how the content item may be accessed, stored, or otherwise used (i.e., viewed, shared, modified, copied, executed, surfaced, or identified) within the online system 140. In one embodiment, a user of the online system 140 may specify privacy settings for a user account that identify a set of users that may access work-experience information on the user account, thus excluding other users from accessing that information. Similarly, privacy settings may specify a "blocked list" of users or other entities that may not access certain information associated with the object, including content providers. For example, a user may specify a set of users who may not access images associated with the user, thus excluding them from accessing the images while simultaneously allowing certain users not within the specified set of users to access the images.

Privacy settings associated with a content item may specify any suitable granularity of permitted access or denial of access. For example, access or denial of access may be specified for particular users of the online system 140, users of the online system within a specified degree of separation, users within a particular group or network, or users associated with a third party content provider. The privacy settings as described herein may describe any suitable granularity of permitted access or denial of access.

In some embodiments, different content items of the same type associated with a certain user may have different privacy settings. Different types of objects associated with a user may have different types of privacy settings. For example, a first user may specify that a first user's posted content is available to be viewed by the public, but any images shared by the first user are available only to the first user's friends in the online social network. As another example, a first user may specify a group of users that may view videos posted from the first users while keeping videos from being available to certain users connected to the first user. In some embodiments, different privacy settings may be established by the online system 140 for different users groups or user demographics.

In some embodiments, a user may specify whether particular types of content items or information associated with the first user may be accessed, stored, or used by the online system 150. For example, the first user may specify that images sent by the first user through the online system 140 may not be stored by the online system 140. As another example, a first user may specify that messages sent from the first user to a particular second user may not be stored by the online system 140. As a further example, a first user may specify that all content items sent via a particular application may be saved by the online system 140.

In additional embodiments, privacy settings may allow a first user to specify whether particular content items or information associated with the first user may be accessed from particular providers. The privacy settings may allow the first user to opt in or opt out of having objects or information accessed from a particular device (e.g., the phone book on a user's client device), from a particular application (e.g., a messaging application), or from a particular system (e.g., an email server). The online system 140 may provide default privacy settings with respect to each device, system, or application, and/or the first user may be prompted to specify a particular privacy setting for each context. For example, the first user may utilize a location-services feature of the online system 140 to provide recommendations for restaurants or other places in proximity to the user. The first user's default privacy settings may specify that the online system 140 may use location information provided from a client device of the first user to provide the location-based services, but that the online system 140 may not store the location information of the first user or provide it to any content provider. The first user may then update the privacy settings to allow location information to be used by a third-party image-sharing application in order to geo-tag photos.

The web server 280 links the online system 140 via the network 130 to the one or more users 120, as well as to the one or more providers 130. The web server 280 serves web pages, as well as other content, such as JAVA®, FLASH®, XML and so forth. The web server 280 may receive and route messages between the online system 140 and the user device 120, for example, instant messages, queued messages (e.g., email), text messages, short message service (SMS) messages, or messages sent using any other suitable messaging technique. A user may send a request to the web server 280 to upload information (e.g., images or videos) that are stored in the content store 205. Additionally, the web server 280 may provide application programming interface (API) functionality to send data directly to native client device 110 operating systems, such as IOS®, ANDROID™, or BlackberryOS.

Semantic Vector Extraction Using a Neural Network

Figure 3:
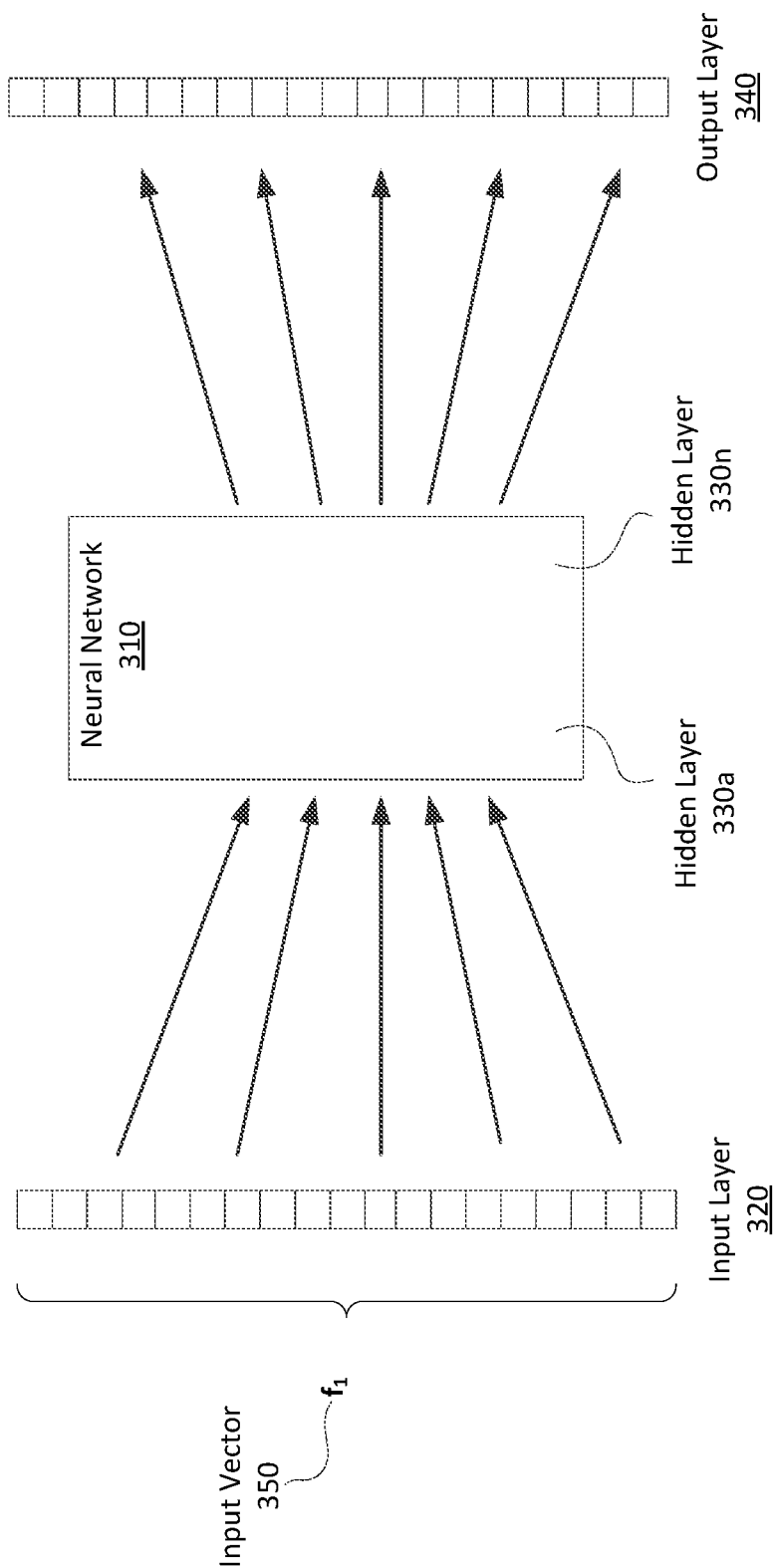
FIG. 3 shows a diagram of an exemplary neural network maintained by the vector extraction module, in accordance with an embodiment of the invention.

To extract semantic vectors from the text strings associated with test content items of the test content store 220, the vector extraction module 230 may implement a neural network to receive the test content item as an input. In other embodiments, the neural network may be applied to extract alternate features from the content items, for example images. FIG. 3 shows a diagram 300 of an exemplary neural network maintained by the vector extraction module (e.g., vector extraction module 230), in accordance with an embodiment of the invention. The neural network 310 is stored in a vector extraction module 230 associated with the online system (e.g., online system 140). The neural network 310 includes an input layer 320, one or more hidden layers 330a-n, and an output layer 340. Each layer of the neural network 310 (i.e., the input layer 320, the output layer 340, and the hidden layers 330a-n) comprises a set of nodes such that the set of nodes of the input layer 320 are input nodes of the neural network 310, the set of nodes of the output layer 340 are output nodes of the neural network 310, and the set of nodes of each of the hidden layers 330a-n are hidden nodes of the neural network 310. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer. A node characteristic may represent data such as text and other data processed using the neural network. The node characteristics values may be any values or parameters associated with a node of the neural network. The neural network 310 may also be referred to as a deep neural network.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the node is connected to every node in the next layer via its output and is connected to every node in the previous layer via its input. Here, the output of a node is defined by an activation function that applies a set of weights to the inputs of the nodes of the neural network 310. Example activation functions include an identity function, a binary step function, a logistic function, a TanH function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, the input vector 350 is a vector describing a text string associated with a test content item. The neural network 310 is configured to determine semantic features of the extracted text of received content items. The layers of neural network 310 are configured to identify features within the extracted text. In some embodiments, early layers of neural network 310 (e.g., layers closer to the input layer) may be convolution layers configured to capture syntactic meanings of the extracted text, while later layers of the neural network 310 (e.g., layers close to the output layer) may be configured to capture semantic meanings of the extracted text. In some embodiments, the layers of the neural network 310 perform recognition of syntactic and/or semantic features by clustering classification, matching, and/or the like.

The hidden layer 330n of the neural network 310 generates a numerical vector representation of an input vector 350 also referred to as an embedding. The numerical vector is a representation of the input vector 350 mapped to a latent space (latent space 156). In some embodiments, the output of the last hidden layer 330n of the neural network 310 is used as the semantic features of the extracted text. The output layer of the neural network 310 outputs one or more scores associated with the input text. In some embodiments, the neural network 310 applies a hash function to the determined semantic features to generate a semantic vector. As such, the extracted text of the test content item may be represented using a hash value generated by the applying a hash function to the embedding obtained from the hidden layer of a neural network processing the content item. In some embodiments, the hash function preserves distances between the semantic features of different pieces of extracted text in an original distance space by minimizing quantization loss.

Each connection between the nodes may be represented by a weight (e.g., numerical parameter determined in training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

During each iteration of training, the neural network 310 generates feature vectors (i.e., semantic vectors) representing the sample input data at various layers. The vector representation has the same number of elements for different input data sets even if the amount of data corresponding to the input data sets are of different sizes.

In some embodiments, the network characteristics of the neural network 310 (e.g., weights between nodes) may be updated using machine learning techniques. For example, the neural network 310 may be provided with a training set comprising known pieces of text. The determined semantic features of the text may be compared to the actual expected semantic features associated with each piece of the text, whereupon the comparison is used to update the network characteristics of the neural network. For example, the neural network 310 may be trained to more easily recognize specific types of semantic features in received text. In some embodiments, the network characteristics of the neural network are learned by optimizing loss function using backpropagation.

Figure 2:
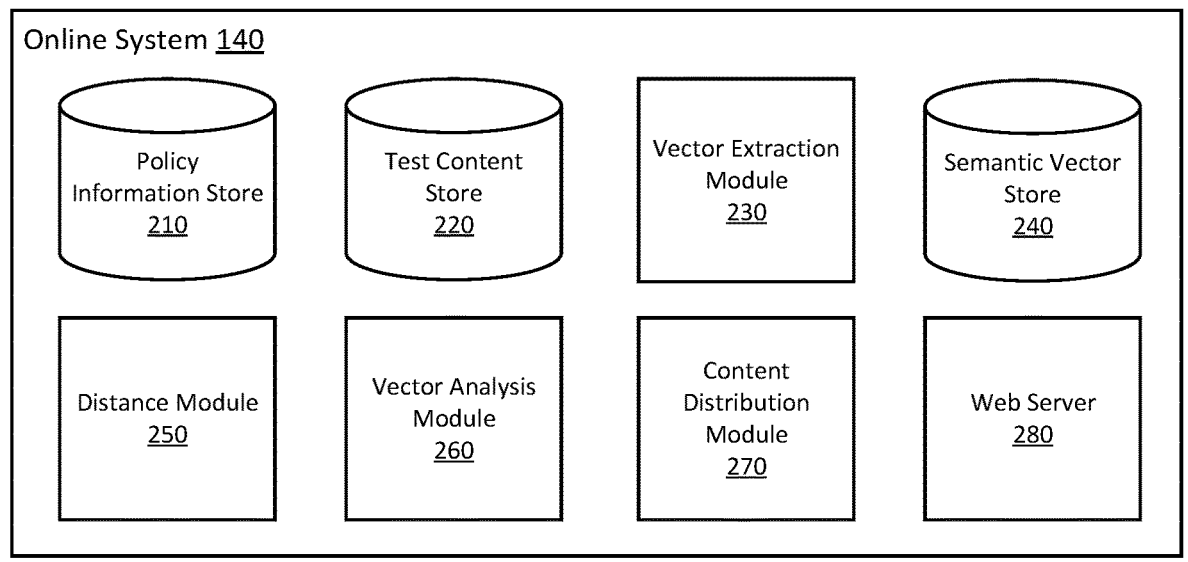
FIG. 2 is a block diagram of the system architecture of the online system 140, in accordance with an embodiment of the invention.

With respect to FIG. 2, within the semantic vector store 240, semantic vectors may be expressed as a 256 bit vector that encodes the semantic features extracted as embeddings from the neural network. In some embodiments, the hash value corresponding to the extracted text is represented as a binary vector, where certain semantic features of the extracted text map to substrings of the binary vector. A substring may represent consecutive bits of the binary vector or bits in various position within the binary vector.

Determining Eligibility of a Test Content Items

Figure 4:
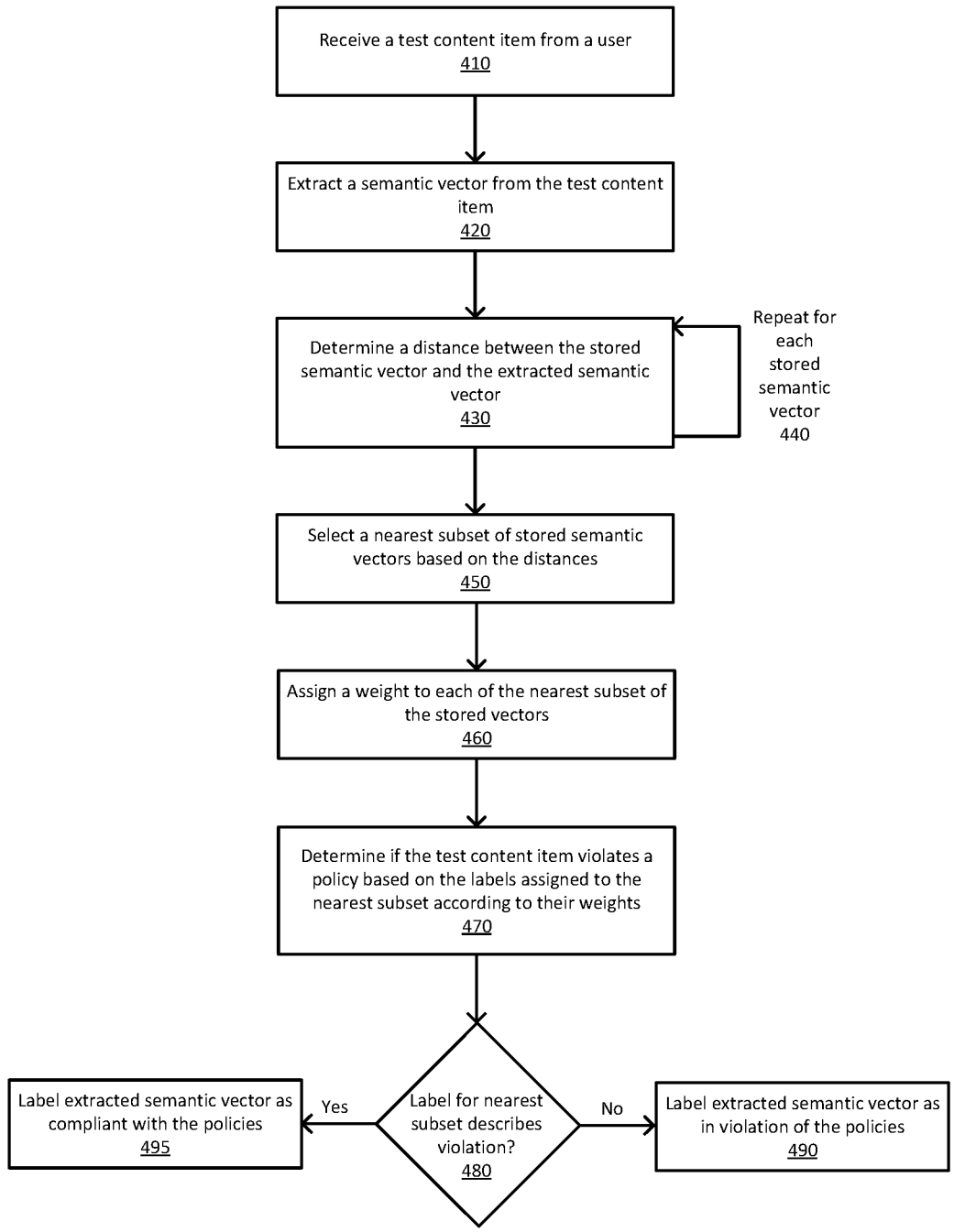
FIG. 4 illustrates a process for determining if a test content item violates a policy of the online system based on multiple stored semantic vectors, in accordance with an embodiment of the invention.

As described above, the online system 140 executes a series of steps or operations to extract a semantic vector from a test content item and compares the extracted semantic vector to a stored semantic vector to determine if the test content item is eligible for presentation to users of the online system 140. FIG. 4 illustrates a process for determining if a test content item violates a policy of the online system based on multiple stored semantic vectors, in accordance with an embodiment of the invention. The online system 140 receives 410 a test content item from a user, for example an image, text, audio, video, link, or a combination thereof. Test content items may be received from a content provider system 120 to be displayed to users within the online system 140, other content provider systems 120 within the online system 140, or an independent third-party server. Once received, test content items are stored within the test content store 220. To characterize the test content item and condense the features of the test content item into a suitable format, the vector extraction module 230 extracts 420 a semantic vector from the test content item using the techniques described above. For example, the vector extraction module 230 may utilize a character recognition algorithm to extract text from the image or video. Text extracted from a test content item may be based upon metadata associated with the image or video, the text within a landing page, or a transcription of at least a portion of the audio content. Once extracted from a content item, a semantic vector describes semantic features of the extracted text, such as an intent or category of the text or descriptors of one or more subjects of the text.

To compare the extracted semantic vector with previously analyzed semantic vectors within the semantic vector store 240, the distance module 250 determines 430 a distance between a stored semantic vector and the extracted semantic vector of the test content item. The distance module 250 repeats 440 the computation of the distance between each semantic vector stored within the semantic vector store 240 and the extracted semantic vector, such that a measure of similarity exists between the test content item and each content item previously analyzed by the online system 140. The distance may be quantified as a Euclidean distance or a Hamming distance.

In some embodiments, as the volume of content items provided to the online system 140 and the rate at which content items are provided to the online system 140 increase, storing semantic vectors for each content item requires a significant amount of computer storage memory and the processing time required to determine all the distances increases significantly. To alleviate the amount of computer memory required and to optimize the processing time required, the semantic vector store 240 may only store semantic vectors for content items which have been determined to be in ineligible. As a result, if a test content item is determined to be similar to a semantic vector within the store 240, it can be concluded that the test content item is in violation of at least the same policies as the similar semantic vector. In some embodiments, the test content item may be found to be in violation of the policies associated with multiple stored semantic vectors and, accordingly, is used to update the semantic score 240. In some embodiments, test content items found to be in violation of the same policies as a single stored semantic vector may not be added to the semantic vector store 240 to prevent redundancy. Additionally, because the process described herein in regard to FIG. 4 implements a search for only the first nearest neighbor to the test content item, executing the search requires less processing power and is algorithmically less intensive.

In some embodiments, the distance module 250 identifies similar stored semantic vectors using multi-index hashing. The stored semantic vectors are split into multiple segments and used to build separate multi-indexing tables. A search is performed on each indexing table to return stored semantic vectors where all segments of the vector are within a threshold distance from a corresponding segment of the semantic vector of the extracted text. The returned stored semantic vectors may be analyzed to determine the shortest distance.

The vector analysis module 260 determines selects 450 a nearest subset of stored semantic vectors based on the determined distance between the test content item and the stored semantic vectors. In one embodiment, the vector analysis module 260 selects a subset of the stored semantic vectors with the smallest determined distances, for example the subset may be comprised of semantic vectors with the five smallest determined distances. In an alternate embodiment, the vector analysis module 260 determines if each distance is above a threshold distance. If a distance is not below a threshold distance (i.e., the extracted semantic vector and a stored semantic vector are not sufficiently similar to each other), the stored semantic vector is removed from consideration. In such an embodiment, if there is no distance below the threshold distance, the process ends. In some implementations, the test content item is then flagged for review by an authorized user per the instructions above. In embodiments in which the semantic vector store 240 only includes ineligible content items, if no distances are below the threshold distance, the process ends 435 and the test content item is labeled as eligible for presentation to users of the online system 140.

In some embodiments, the vector analysis module 260 maps different distances to probabilities that a content item violates one or more policies, wherein the threshold value corresponds to a particular probability value (e.g., 90%). As such, if the determined distance is within the threshold distance, the received content item is considered to be likely violating a policy, and is ineligible for display to users of the online system 140. In addition, the semantic vector corresponding to the extracted text of the test content item is added to the semantic vector store 240.

In some embodiments, a distance may be compared against multiple different threshold distances associated with a respective policy. The vector analysis module 260 can perform different actions or operations on the content item based upon how the distance compares to the different threshold distances. For example, if the distance is less than the first threshold distance, then the test content item may be automatically rejected (e.g., determined to violate the policy). If the distance is greater than the second threshold distance, then the test content item may be automatically deemed eligible, and may be queued for display to users (assuming the content item also does not violate other policies). On the other hand, if the distance is less than the second threshold distance but greater than the first threshold value, the vector analysis module 260 may submit the test content item for further review by an authorized user.

In some embodiments, the vector analysis module 260 may adjust the values of the first threshold and/or second threshold distances as additional semantic vectors are processed. For example, in an embodiment where it is determined that the stored ineligible semantic vectors are causing large numbers of false positives (e.g., rejection of content items that do not violate policy, but are associated with semantic vectors within a first threshold distance of semantic vectors of content items that do violate policy), the first threshold for the policy may be adjusted to correspond to a smaller distance, to narrow the scope of semantic vectors that are rejected and prevent false positives.

To each stored semantic vectors included within the selected subset, the vector analysis module 260 assigns 460 a weight. In one embodiment, a stored semantic vector is based on a combination of one or more of the following: a number of policies violated by the content item associated with stored semantic vector, the categories of policies violated by the content item, and the distance between the stored semantic vector and the extracted semantic vector for the test content item. In one embodiment, the weights assigned to stored semantic vectors are inversely related to the determined distance, for example inversely proportional. Smaller distances between a stored semantic vector and an extracted semantic vector are assigned larger weights. As a result, the vector analysis module 260 assigns a higher priority to stored semantic vectors sharing a greater number of similarities with the extracted semantic vector. Based on the assigned weights, the vector analysis module 260 may rank the stored semantic vectors in an order representative of how similar they are to the extracted semantic vector of the test content item, for example prioritizing stored semantic vectors with low distances. From the weighted semantic vectors, the vector analysis module 260 selects a subset of the stored semantic vectors. In one embodiment, the amount of stored semantic vectors included in the subset is a based on the total number of semantic vectors stored within the semantic vector store 240, the relative weights of the weighted semantic vector stores (for example, if all of semantic vectors are assigned low weights, the subset may include a larger number of stored semantic vectors), the type of test content item, or any number of additional factors. In some embodiments, the number of stored semantic vectors included in the subset is based on the semantic or graphic features of the test content item, for example the context or features of an image, the interpretation of the text or the raw text of the test content item, or the metadata of the test content item. In another embodiment, the number of semantic vectors included in the subset is pre-determined by an authorized user of the online system 140 based on the features or category of a content item and stored in a lookup table which is reference by the vector analysis module 260.

The vector analysis module 260 determines 470 whether the test content item violates a policy of the online system 140 based on an analysis of the eligibility labels assigned to each of the subset of weighted semantic vectors. In one embodiment, the vector analysis module 260 determines an eligibility status of the test content item using the weighted semantic vector with the smallest distance or the smallest distance away from the extracted semantic vector. If the label for the weighted semantic vector describes 480 a violation of one or more policies within the online system 140 (i.e., ineligible), the vector analysis module 260 labels 490 the extracted semantic vector and the test content item as in violation of the same policies as the weighted semantic vector (i.e., ineligible for presentation to users of the online system 140). However, if the label for the weighted semantic vector does not describe 480 a violation of one or more policies within the online system 140 (i.e., eligible), the vector analysis module 260 labels 495 the extracted semantic vector and the test content item as compliant with the policies of the online system 140 (i.e., eligible for presentation to users of the online system).

In an alternate embodiment, the vector analysis module 260 determines if the test content item violates a policy based on the labels assigned to all of the weighted semantic vectors of the subset. For example, each weighted semantic vector may be assigned a binary label of "0" or "1", where a label of "0" represents an ineligible content item and a "1" represents an eligible content item. The vector analysis module 260 determines a weighted average of the weighted semantic vectors by summing the product of assigned weight and the binary label of each semantic vector of the subset. The vector analysis module 260 compares the weighted average to threshold values (e.g., a threshold value defining the lower limit for scores for eligible test content items and a threshold value defining the upper limit for scores for ineligible test content items) to determine if the test content item is eligible or ineligible for presentation to users of the online system 140. If the weighted average of the subset of semantic vectors is above the threshold value (i.e., closer to a value of 1), the vector analysis module 260 labels the test content item as eligible for presentation to users of the online system 140. If the weighted average of the subset of semantic vectors is below the threshold value (i.e., closer to a value of 0), the vector analysis module 260 labels the test content item as ineligible for presentation to users of the online system 140.

Depending on the value of the weighted average, the vector analysis module 260 may present the test content to an authorized user for a manual review. For example, the vector analysis module 260 may implement a first threshold value of 0.2 indicating that test content items with weighted averages below 0.2 are ineligible and second threshold value of 0.8 indicating that test content items with weighted averages above 0.8 are eligible. However, depending on the binary labels (0 or 1) assigned the stored semantic vectors and the number of eligible stored semantic vectors versus ineligible stored semantic vectors, the weighted averages may be a value between 0.2 and 0.8 which the vector analysis module 260 may not be able to readily discern as eligible or ineligible. In such embodiments, the test content item would be flagged for review by an authorized human user.

Figure 5:
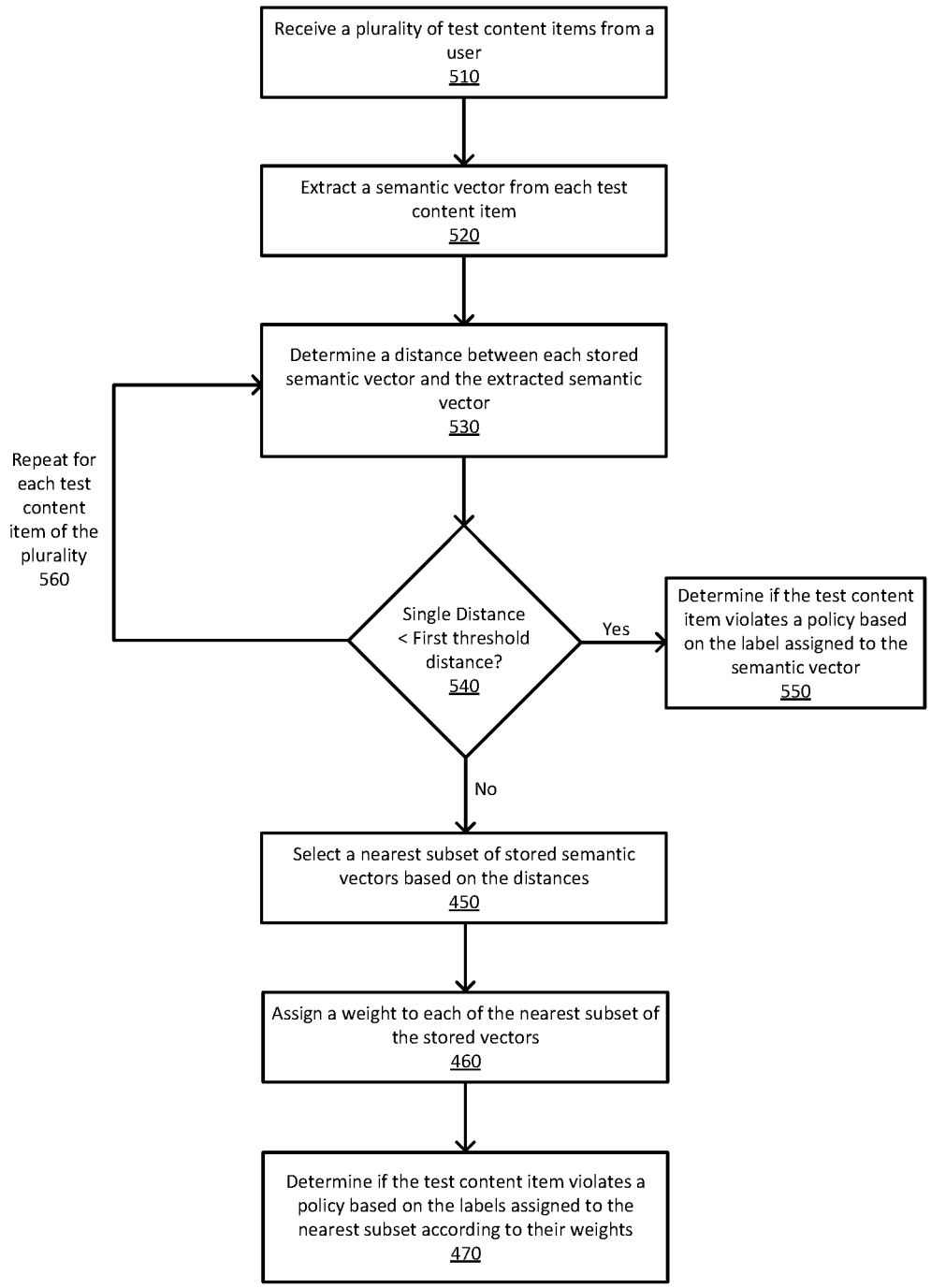
FIG. 5 illustrates a two-stage process for determining if a test content item violates a policy of the online system based on a first comparison to a single stored semantic vector and a second comparison to a multiple stored semantic vectors, in accordance with an embodiment of the invention.

In some embodiments, the process described above in reference to FIG. 4 can be segmented into two to determine the eligibility of a test content item. FIG. 5 illustrates a two-stage process for determining if a test content item violates a policy of the online system 140 based on a first comparison to a single stored semantic vector and a second comparison to multiple stored semantic vectors, in accordance with an embodiment.

The online system 140 receives 510 a plurality of test content items from a user which are stored within the test content store 220. The vector extraction module 230 extracts 520 a semantic vector from each test content item and determines 515305 a distance between each stored semantic vector and each extracted semantic vector using the techniques described above with reference to FIG. 2 and FIG. 4. Each determined distance is compared 540 to a first threshold distance. If a single distance is below the first threshold distance (i.e., an indication that the extracted semantic vector and the stored semantic vector are separated by a distance below the threshold), the vector analysis module 260 determines 550 if the test content item violates a policy based on the label (eligible or ineligible) assigned to the stored semantic vector within the threshold distance. The comparison of the distance to the first threshold distance is repeated 560 for each received test content item. Test content items for which a stored semantic vector is identified within the first threshold distance are removed from the test content store 220 after being assigned an eligibility label.

For the remaining received test content items, the vector analysis module 260 selects 450 a nearest subset based on the determined scores. As described above in reference to FIG. 4, the nearest subset may be selected as a certain number of stored semantic vectors with the smallest distances or based on a comparison to a second threshold. When implemented, the first threshold distance is a smaller distance than the second threshold distance to reduce the stored semantic vectors from a subset to a single stored vector. If no stored semantic vectors are identified the process ends consistent with the description above with reference to FIG. 4. When the subset of stored semantic vectors are identified, the process proceeds through steps 470-495 as described above with reference to FIG. 4. The vector analysis module 260 repeats 450 the second stage involving the subset of the stored semantic vectors for each remaining test content item of the plurality.

By segmenting the steps into the two stages described above, vector analysis module 260 improves the processing time required to determine the eligibility of test content items. Should the conditions of the first threshold distance be met by a single stored semantic vector, the process is halted and the test content item receives a label describing its eligibility status. Only in an implementation in which no stored semantic vector meets the first threshold distance module 250 does to the process continue to the second stage to determine the eligibility of the test content item using a subset of multiple stored semantic vectors.

Reviewing Policy Data Stores for False Positives

In some embodiments, the vector analysis module 260 may review the stored semantic vectors corresponding to a policy of the online system 140 to determine whether the ineligible semantic vectors stored in semantic vector store 240 corresponding to the policy are accurate indicators of eligibility under the policy. For example, a first stored semantic vector corresponding to extracted text of a first content item that is ineligible under the policy may be similar to a second stored semantic vector corresponding to extracted text of a second content item that is eligible under the policy, and as such may cause the second content item to be deemed ineligible and for the second stored semantic vector to be erroneously labeled as ineligible for presentation to users under the policy—a false positive. As an example, an online system 140 may have a first policy that disallows content items directed to the selling of services, but allow content items directed to the selling of goods. In some embodiments, the extracted text of a content item directed to the selling of goods (allowed) may be semantically similar to past content items labeled ineligible because they were directed to the selling of services, and as such may be erroneously labeled as ineligible under the policy. A false positive stored in a policy information store 210 may cause eligible content items having text that is semantically similar to the false positive to be determined to violate the policy and stored as additional false positives.

As such, it may be desirable to remove from the semantic vector store 240 semantic vectors corresponding to extracted text that violates a policy, but are semantically similar to at least a threshold number of semantic vectors corresponding to extracted text that is eligible under the same policy. For example, a first piece extracted text may be directed to selling of services (disallowed under policy), but is semantically similar to many pieces of extracted text directed to selling of goods, such that content items associated with those pieces of extracted text are likely to be automatically rejected by the vector analysis module 260 under the policy as false positives. As such, the semantic vector of the first piece of extracted text may be removed from the semantic vector store 240 despite violating the policy, in order to reduce the chances of false positives.

In some embodiments, the vector analysis module 260 may review stored semantic vectors of each policy of the policy information store 210 on a periodic basis (e.g., every day), in order to ensure that false positives do not remain in the semantic vector store 240 for extended periods of time (and potentially causing other false positives to be stored). In some embodiments, false positive semantic vectors can be removed by determining the overall labels for the semantic vectors (e.g., using majority vote as described above). In addition, semantic vectors corresponding to extracted text that violates the policy, but are considered likely to cause non-violating semantic vectors to be determined to violate the policy, may also be removed from the semantic vector store 240. In some embodiments, an authorized user may also initiate review of information within the policy information store 210 related to a specific policy or in response to other criteria being satisfied (e.g., the number of ineligible semantic vectors reaching a threshold amount).

The vector analysis module 260 uses eligible semantic vectors stored within the semantic vector store 240 to identify store semantic vectors that are not good indicates of the eligibility of content items (e.g., false positives, or ineligible semantic vectors that are similar to at least a threshold number of eligible semantic vectors). For example, vector analysis module 260 may analyze one or more ineligible semantic vectors of the semantic vector store 240 to determine one or more similar semantic vectors, and remove a semantic vector from the semantic vector store 240 based upon a number of similar eligible semantic vectors.

The vector analysis module 260 generates a sampling of eligible semantic vectors. For example, the vector analysis module 260 may access the semantic and retrieve a random sampling of eligible semantic vectors. In some embodiments, the sampling of eligible semantic vectors comprises a predetermined number of vectors.

The vector analysis module 260 performs, for the ineligible semantic vectors corresponding to one or more different policies, a similarity search using the generated sampling of eligible semantic vectors. In some embodiments, to perform the similarity search the vector analysis module 260 determines, for each ineligible semantic vector, a number of eligible semantic vectors of the sampling that the ineligible semantic vector is similar to (e.g., having a distance within a threshold value). In some embodiments, the threshold value for determining similarity may be based upon the specific policy associated with the ineligible semantic vector. In some embodiments, the similar eligible vectors for each ineligible semantic vector may be determined using a DocNN model or a FANN (fast approximate nearest neighbor) model.

The vector analysis module 260 determines for each eligible semantic vector, whether the number of similar ineligible vectors of the sampling of eligible semantic vectors exceeds a threshold value. In some embodiments, the threshold value is a predetermined value, or may be based upon the total number of sampled similar vectors (e.g., a percentage of the total number of eligible vectors within the sampling).

In some embodiments, the vector analysis module 260 may weigh the identified eligible similar vectors based upon a level of similarity between the ineligible semantic vector and the identified eligible similar vectors, and calculate an aggregate metric based upon the weighted eligible similar vectors. For example, similar eligible vectors that are more similar to the ineligible semantic vector (e.g., have a smaller distance with the ineligible semantic vector) may be weighed more heavily in comparison to similar eligible vectors that are less similar. The aggregate metric may then be compared against a threshold value.

If the number of eligible similar vectors compared to ineligible semantic vector satisfies the threshold value (or the aggregate metric satisfies the threshold value), then the vector analysis module 260 may deem the ineligible semantic vector to be too similar to eligible semantic vectors for the purpose of performing automatic rejection, and remove the ineligible semantic vector from the semantic vector store 240. In some embodiments, ineligible semantic vectors removed from the semantic vector store 240 may be maintained and stored in a separate data store (e.g., user review semantic store, not shown) and used to determine if a received content item should be subject to user review. For example, if the semantic vector of the extracted text corresponding to a received content item is determined to be similar to a semantic vector of an ineligible semantic store, the semantic vector of the content item may be automatically labelled "ineligible." On the other hand, if the semantic vector is similar to a semantic vector of the agent review semantic store, the content item is submitted for agent review instead of automatically labelled "ineligible."

In some embodiments, the process described above is performed periodically. By periodically assessing the stored semantic vectors associated with each policy against the stored semantic vectors of eligible content items, the vector analysis module 260 removes semantic vectors of false positive content items and semantic vectors that are not good indicators of eligibility from the semantic vector store 240, potentially improving the accuracy of the vector analysis module 260 when reviewing subsequent content items.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   storing, in an online system, a plurality of semantic vectors, each semantic vector representing a content item within the online system and assigned a label indicating whether the content item has violated a policy of the online system, the policy identifying one or more attributes of content items considered ineligible for presentation to users of the online system;
   receiving, at the online system, a test content item from a user of the online system;
   extracting a semantic vector from the test content item based on features within the test content item, the semantic vector indicating one or more semantic features of the test content item;
   determining a distance between each stored semantic vector and the extracted semantic vector of the test content item;
   selecting a nearest subset of the stored semantic vectors based on the determined distances;
   assigning a weight to each of the nearest subset of the stored semantic vectors, wherein the weight is inversely related to the determined distance; and
   determining whether the test content item violates the policy of the online system by aggregating the labels assigned to the selected nearest subset of the stored semantic vectors weighted according to the assigned weights for the selected nearest subset of the stored semantic vectors.

2. The method of claim 1, wherein the plurality of stored vectors comprises:
   one or more semantic vectors assigned a label indicating that an image is consistent with policies of the online system; and
   one or more semantic vectors assigned a label indicating whether the image has violated a policy of the online system.

3. The method of claim 1, wherein extracting the semantic vector from the test content item further comprises:
   extracting text from the test content item, the extracted text corresponding to a body of text of the test content item;
   providing the extracted text as input to a neural networking comprising a plurality of layers; and
   extracting the semantic vector representing the extracted text based upon an output of a hidden layer of the neural network.

4. The method of claim 1, wherein the weight assigned to each stored semantic vector is inversely proportional to the determined distance.

5. The method of claim 1, further comprising:
   assigning a label to the test content item indicating whether the image has violated a policy of the online system; and
   updating the plurality of semantic vectors stored by the online system with the extracted semantic vector of the test content item.

6. The method of claim 1, wherein determining whether the test content item violates the policy further comprises:
   identifying the test content item as ineligible for presentation to users of the online system based on one or more policies of the online system.

7. The method of claim 1, further comprising:
   determining that the test content item complies with the policies of the online system based on the label assigned to the weighted semantic vector with the distance representing the smallest distance between the stored semantic vector of the test content item; and
   identifying the test content item as eligible for presentation to users of the online system based on one or more policies of the online system.

8. The method of claim 1, further comprising:
   identifying semantic vectors of the stored semantic vectors that are compliant with the policies of the online system;
   for a semantic vector determined to be in violation of a policy of the online system, identifying a plurality of compliant semantic vectors within a threshold distance of the ineligible semantic vector; and removing the semantic vector in violation of the policy of the online system from the stored semantic vectors when the number of compliment semantic vectors meets a threshold number.

9. The method of claim 1, wherein the distance comprises a Euclidean distance or a Hamming distance.

10. A computer-implemented method comprising:
storing, in an online system, a plurality of semantic vectors, each semantic vector representing a content item within the online system and assigned a label indicating whether the content item has violated a policy of the online system, the policy identifying one or more attributes of content items considered ineligible for presentation to users of the online system;
receiving, at the online system, a plurality of test content items from one or more users of the online system;
for each test content item, extracting a semantic vector based on features within the test content item, the semantic vector indicating one or more semantic features of the test content item;
determining a distance between each stored semantic vector and the extracted semantic vector of the test content item;
for each test content item of a first subset,
identifying a stored semantic vector within a first threshold distance, the distance representing a distance between the stored semantic vector and the extracted semantic vector of the test content item,
determining that the test content item violates a policy of the online system based on the label assigned to the identified stored semantic vector; and
for each test content items excluded from the first subset,
selecting a nearest subset of the stored semantic vectors based on the determined distances,
assigning a weight to each of the nearest subset of the stored semantic vectors, wherein the weight is inversely related to the determined distance, and
determining whether the test content item violates the policy of the online system by aggregating the labels assigned to the selected nearest subset of the stored semantic vectors weighted according to the assigned weights for the selected nearest subset of the stored semantic vectors.

11. The method of claim 10, wherein the plurality of stored vectors comprises:
one or more semantic vectors assigned a label indicating that an image is consistent with policies of the online system; and
one or more semantic vectors assigned a label indicating whether the image has violated a policy of the online system.

12. The method of claim 10, wherein extracting the semantic vector from the test content item further comprises:
extracting text from the test content item, the extracted text corresponding to a body of text of the test content item;
providing the extracted text as input to a neural networking comprising a plurality of layers; and
extracting the semantic vector representing the extracted text based upon an output of a hidden layer of the neural network.

13. The method of claim 10, wherein the weight assigned to each stored semantic vector is inversely proportional to the determined distance.

14. The method of claim 10, further comprising:
assigning a label to the test content item indicating whether the image has violated a policy of the online system; and
updating the plurality of semantic vectors stored by the online system with the extracted semantic vector of the test content item.

15. The method of claim 10, wherein determining that the test content item violates a policy further comprises:
identifying the test content item as ineligible for presentation to users of the online system based on one or more policies of the online system.

16. The method of claim 10, further comprising:
determining that the test content item complies with the policies of the online system based on the label assigned to the weighted semantic vector with the distance representing the smallest distance between the stored semantic vector of the test content item; and
identifying the test content item as eligible for presentation to users of the online system based on one or more policies of the online system.

17. The method of claim 10, further comprising:
identifying semantic vectors of the stored semantic vectors that are compliant with the policies of the online system;
for a semantic vector determined to be in violation of a policy of the online system, identifying a plurality of compliant semantic vectors within a threshold distance of the ineligible semantic vector; and
removing the semantic vector in violation of the policy of the online system from the stored semantic vectors when the number of compliment semantic vectors meets a threshold number.

18. The method of claim 10, wherein the distance comprises a Euclidean distance or a Hamming distance.

19. The method of claim 10, wherein the second threshold distance is a greater distance than the first threshold distance.

20. A non-transitory computer readable medium storing instructions comprising:
storing, in an online system, a plurality of semantic vectors, each semantic vector representing a content item within the online system and assigned a label indicating whether the image has violated a policy of the online system, the policy identifying one or more attributes of content items considered ineligible for presentation to users of the online system;
receiving, at the online system, a test content item from a user of the online system;
extracting a semantic vector from the test content item based on features within the test content item, the semantic vector indicating one or more semantic features of the test content item;
determining a distance between each stored semantic vector and the extracted semantic vector of the test content item;
selecting a nearest subset of the stored semantic vectors based on the determined distances;
assigning a weight to each of the nearest subset of the stored semantic vectors, wherein the weight is inversely related to the determined distance; and
determining whether the test content item violates the policy of the online system by aggregating the labels assigned to the selected nearest subset of the stored semantic vectors weighted according to the assigned weights for the selected nearest subset of the stored semantic vectors.

* * * * *